United States Patent
Yeiser, IV

(10) Patent No.: US 10,995,886 B2
(45) Date of Patent: *May 4, 2021

(54) METAL GARDEN HOSE WITH STRAIN RELIEF

(71) Applicant: Yeiser Research & Development LLC, Santee, CA (US)

(72) Inventor: John O. Yeiser, IV, Santee, CA (US)

(73) Assignee: YEISER RESEARCH & DEVELOPMENT, LLC, Santee, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/390,981

(22) Filed: Apr. 22, 2019

(65) Prior Publication Data

US 2019/0316710 A1 Oct. 17, 2019

Related U.S. Application Data

(63) Continuation of application No. PCT/US2018/012389, filed on Jan. 4, 2018, which is
(Continued)

(51) Int. Cl.
| | |
|---|---|
| *F16L 11/00* | (2006.01) |
| *F16L 11/10* | (2006.01) |
| *F16L 57/00* | (2006.01) |
| *F16L 57/02* | (2006.01) |
| *F16L 27/04* | (2006.01) |
| *E03F 1/00* | (2006.01) |

(52) U.S. Cl.
CPC ............ *F16L 11/10* (2013.01); *E03F 1/00* (2013.01); *F16L 27/04* (2013.01); *F16L 57/005* (2013.01); *F16L 57/02* (2013.01)

(58) Field of Classification Search
CPC ......... F16L 11/10; F16L 27/04; F16L 57/005; F16L 57/02
USPC ................................. 138/109, 110, 120, 135
See application file for complete search history.

(56) References Cited

U.S. PATENT DOCUMENTS

| | | | |
|---|---|---|---|
| 762,954 A * | 6/1904 | Smith ................ | F16L 11/085 138/124 |
| 967,901 A * | 8/1910 | Greenfield .......... | F16L 35/00 285/45 |

(Continued)

FOREIGN PATENT DOCUMENTS

| | | | | |
|---|---|---|---|---|
| WO | WO-2016085736 A1 | ‡ | 6/2016 | ............. F16L 11/12 |
| WO | WO-2016172019 A1 | ‡ | 10/2016 | ............. F16L 11/10 |

OTHER PUBLICATIONS

PCT/US2018/012389 International Search Report and Written Opinion, 7 pages, dated Mar. 16, 20118.‡

*Primary Examiner* — James F Hook
(74) *Attorney, Agent, or Firm* — Eleanor Musick; Musick Davison LLP

(57) ABSTRACT

A metal-shelled hose assembly includes a metal outer shell lined with a flexible, water-tight inner tubing integrated with a bendable strain-relief section that is configured to allow the metal-shelled hose to be pulled from a straight angle regardless of where it is attached. The bendable strain-relief section is provided at least at the faucet end of the hose, where it effectively changes the angle of the length of the metal hose relative to the faucet when the hose is pulled at an angle to the faucet.

17 Claims, 5 Drawing Sheets

Related U.S. Application Data a continuation of application No. 15/402,129, filed on Jan. 9, 2017, now Pat. No. 10,267,437.

(56) References Cited

U.S. PATENT DOCUMENTS

| | | | | |
|---|---|---|---|---|
| 1,091,759 | A * | 3/1914 | Paradis | F16L 33/01 285/222.1 |
| 1,528,967 | A * | 3/1925 | Bersted | F16N 21/00 184/105.3 |
| 2,759,765 | A * | 8/1956 | Pawley | F16L 11/12 239/588 |
| 3,623,513 | A ‡ | 11/1971 | Dinkelkamp | F16L 11/14 138/114 |
| 3,929,164 | A ‡ | 12/1975 | Richter | F16L 11/121 138/103 |
| 4,345,624 | A ‡ | 8/1982 | Rider | F16L 57/00 138/110 |
| 4,669,757 | A ‡ | 6/1987 | Bartholomew | F16L 11/10 138/135 |
| 5,143,409 | A ‡ | 9/1992 | Lalikos | F16L 35/00 285/11 |
| 5,333,650 | A ‡ | 8/1994 | Folkman | F16L 33/34 138/10 |
| 5,368,235 | A ‡ | 11/1994 | Drozdoff | A01G 25/06 138/44 |
| 5,624,074 | A * | 4/1997 | Parisi | E03C 1/04 239/588 |
| 6,557,788 | B1 ‡ | 5/2003 | Huang | F16L 33/223 239/58 |
| 7,302,972 | B1 * | 12/2007 | Stowe | F16L 47/20 138/109 |
| D757,233 | S ‡ | 5/2016 | Vaz | D23/26 |
| D770,601 | S ‡ | 11/2016 | Melo | D23/26 |
| D779,640 | S ‡ | 2/2017 | Vaz | D23/26 |
| 9,625,071 | B2 ‡ | 4/2017 | Melo | F16L 57/005 |
| 9,810,357 | B2 ‡ | 11/2017 | Blanchette | F16L 33/207 |
| 9,815,254 | B2 ‡ | 11/2017 | Blanchette | B32B 1/00 |
| 10,267,437 | B2 * | 4/2019 | Yeiser | F16L 11/10 |
| 2004/0050440 | A1 * | 3/2004 | Vohrer | E03C 1/021 138/109 |
| 2006/0151038 | A1 ‡ | 7/2006 | Gregrich | B60T 17/043 138/109 |
| 2006/0273191 | A1 ‡ | 12/2006 | Pastuch | F16L 11/10 239/201 |
| 2007/0079885 | A1 ‡ | 4/2007 | Zaborszki | F16L 11/15 138/12 |
| 2011/0215567 | A1 ‡ | 9/2011 | Hurwitz | F16D 1/072 285/25 |
| 2012/0042980 | A1 ‡ | 2/2012 | Mezzalira | B32B 1/08 138/13 |
| 2012/0234424 | A1 ‡ | 9/2012 | Bernhardt | F16L 33/223 138/13 |
| 2013/0213514 | A1 ‡ | 8/2013 | Berardi | F16L 11/00 138/10 |
| 2014/0130930 | A1 ‡ | 5/2014 | Ragner | F16L 11/118 138/12 |
| 2015/0053298 | A1 ‡ | 2/2015 | Tussy | A61M 39/08 138/11 |
| 2015/0354731 | A1 ‡ | 12/2015 | Ragner | F16L 11/118 138/11 |
| 2016/0146379 | A1 ‡ | 5/2016 | LaTulippe | B32B 7/05 138/11 |
| 2016/0178092 | A1 ‡ | 6/2016 | Berardi | F16L 11/00 138/11 |
| 2016/0312925 | A1 ‡ | 10/2016 | Blanchette | F16L 33/207 |
| 2016/0312927 | A1 ‡ | 10/2016 | Blanchette | B32B 1/00 |
| 2016/0312928 | A1 ‡ | 10/2016 | Blanchette | F16L 11/10 |
| 2016/0312929 | A1 ‡ | 10/2016 | Blanchette | B32B 1/00 |
| 2016/0312940 | A1 ‡ | 10/2016 | Melo | F16L 57/005 |
| 2017/0234471 | A1 ‡ | 8/2017 | Oberlander | F16L 11/10 138/103 |

\* cited by examiner
‡ imported from a related application

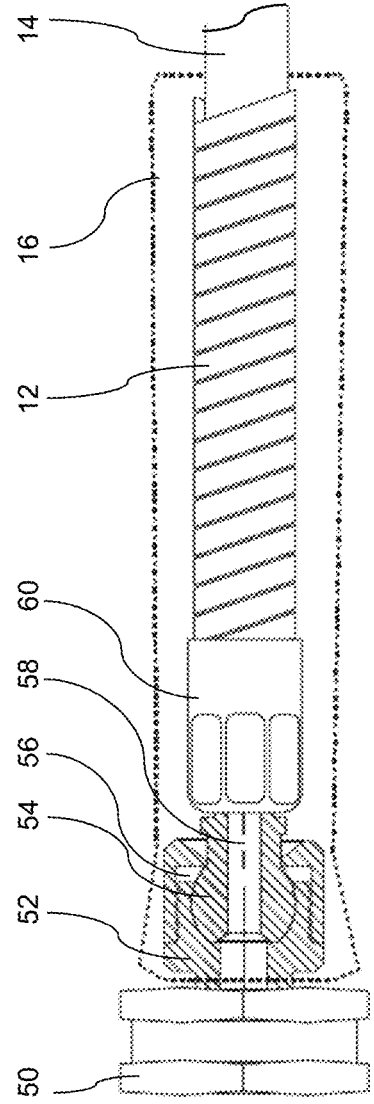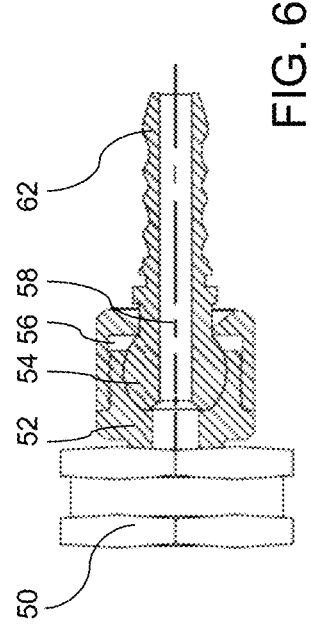

METAL GARDEN HOSE WITH STRAIN RELIEF

RELATED APPLICATIONS

This is a continuation of U.S. application Ser. No. 15/402,129, filed Jan. 9, 2017, issued as U.S. Pat. No. 10,267,437, and is a continuation of International Application No. PCT/US2018/012389, filed Jan. 4, 2018, each of which is incorporated herein by reference in its entirety.

FIELD OF THE INVENTION

The present invention relates to a water hose and more particularly to a metal garden hose assembly that is resistant to damage from strain and stresses during use.

BACKGROUND OF THE INVENTION

Homeowners, gardeners, maintenance workers, and others who require water to maintain or clean outdoor areas are constantly looking for ways to manage and simplify their access to water sources. Conventional garden hoses made of rubber or heavy rubber-like materials reinforced with embedded webbing or fabric strands tend to be difficult to handle—they can be heavy and fairly stiff, resisting uncoiling, especially when cool, causing them to be dragged across, and causing damage to, nearby plants or landscape features when the user tries to stretch the hose to reach a remote location. When lighter weight plastics are used to manufacture such hoses, they tend to kink and/or puncture easily.

One relatively recent approach to the drawbacks of conventional rubber hoses has been the flat hose, for example, those sold under the trademarks XHO SE® and POCKET HOSE® (see, e.g., U.S. Design Pat. No. 731,032), which combines a thin, flexible, highly expandable PVC (polyvinylchloride) tubing surrounded by a NYLON® or other fabric sleeve, with conventional hose fittings on the ends. Such hoses are lightweight and easy to manage, but possess a number of disadvantages, including catastrophic failures that can occur at stress points along the hose, causing the hose to form a bubble at a weak point and abruptly burst. Also, they are easily punctured by cactus spines, sticks, and sharp edges that may be encountered while working in a garden or construction site, and are subject to damage by pets or other animals chewing on the hose. Finally, because pressure is necessary to expand the hose to allow water to flow, the flat hoses are ineffective for applications such as transferring water from rain barrels or other non-pressurized water sources.

A type of hose that is often used in industrial settings has a braided or coiled metal outer hose encasing a flexible inner rubber or PVC hose. Metal-shelled hoses possess several desirable features, include resistance to burst, crush, puncture, and abrasion. Such hoses are comparable in weight to conventional rubber hoses, or even lighter, but are easier to flex for positioning, provided that the degree of curvature is large enough that they are not forced to bend at a sharp angle. The bending limitation tends not to be a problem in industrial applications, where hoses are used to attach a stationary machine to a water source and are not subject to frequent re-positioning, however, it can become a significant problem for use in the garden or around the home, where stretching and pulling on the hose around corners are commonplace. Since the usual manner of reaching a remote location with a garden hose is to keep pulling until it stops, a considerable amount of stress and strain can be applied to fitting at the faucet end of the hose. While a rubber or flat hose may be able to hold up to being pulled at a relatively sharp angle near the faucet end, the outer shell of a metal hose is susceptible to kinks and breakage if pulled too forcefully at an angle that is less that the natural curvature of the metal shell, permanently crimping or distorting the protective metal coils and exposing the inner tubing to damage. Thus, while many of the features of a hose with an outer metal shell would be desirable for garden hose applications, existing metal-shelled hoses are not constructed to tolerate the abuse to which everyday garden hoses are frequently subjected. Accordingly, the need remains for a hose design that provides the advantages of a metal-shell construction while minimizing the risk of damage from common uses.

BRIEF SUMMARY

In an exemplary embodiment, a metal-shelled hose assembly includes a metal outer shell lined with a flexible, water-tight inner tubing integrated with a bendable strain-relief section that is configured to allow the metal-shelled hose to be pulled from a straight angle regardless of where it is attached. This capability is provided by including a flexible section at least at the faucet end of the hose, where the flexible section effectively changes the angle of the length of the metal hose relative to the faucet when the hose is pulled. In this manner, the hose moves freely without risk of damage to the metal shell.

In a first embodiment, a metal-shelled hose assembly includes a metal outer shell connected to a flexible hose section adjacent a fitting end. A resilient inner hose connected to the flexible hose section creates a continuous flow path from one end of the hose assembly to the other. The flexible hose section may be located at both ends of the hose assembly, or may be disposed only at the female fitting end of the hose assembly, where the hose is attached to a faucet or hose bib. The flexible hose section comprises a typically short length, approximately 6 to 25 cm (about 2.5 to 6 in.), of flexible tubing formed of polyurethane, polyvinylchloride (PVC), polytetrafluoroethylene (PTFE), or similar polymer or rubber material, preferably reinforced with polyester or other woven braid, which provides strain relief near the fitting. The first end of the flexible hose section is connected to the hose fitting via an insertable stem, such as a barbed, corrugated, threaded, flared, or similar insertable stem-like coupler that forms a water-tight seal with the inner surface of the hose by way of an interference-type or friction fit. The second end of the flexible hose section is connected to the metal outer shell by a metal clip and to the inner hose by a stem connector. A protective outer boot encloses the flexible hose and its connectors.

In a second embodiment, the strain relief section is a ball joint assembly disposed at the faucet end of the hose, with one end of the ball joint assembly attached to the female hose fitting and the other end of the ball joint assembly connected to the metal-shelled hose.

In one embodiment, the metal outer shell is formed of a helical coil of 304 stainless steel. Other materials that may be used include other metals, including aluminum, galvanized or other steel, rubber, durable (impact resistant) plastic or polymer, KEVLAR®, or other durable material, which may be braided, woven, coiled or otherwise formed to enhance durability and flexibility of the assembly. The inner hose may be formed from PVC, PTFE, or similar material.

In one aspect of the invention, a hose assembly includes a flexible metal shell having a proximal end and a distal end; an inner hose disposed within the metal shell, the inner hose having a proximal end and a distal end; an inlet fitting connected to the proximal end of each of the metal shell and the inner hose, the inlet fitting configured for releasable connection to a water source; an outlet fitting connected to the distal end of each of the metal shell and the inner hose, the outlet fitting having an outlet stem connector; and at least one strain relief assembly disposed at least between the inlet fitting and the proximal ends of the metal shell and the inner hose, wherein the strain relief assembly is configured to modify the angle of the metal shell and inner hose assembly relative to the water source when pulled. In a first embodiment, the strain relief assembly comprises: a flexible tubing segment having a first end, a second end, and a diameter to produce an interference fit over the inlet stem connector at the first end; a first cylindrical clip configured for securing the first end of the tubing segment to the inlet stem connector; a double-ended hose fitting having a first stem end and a second stem end, the first stem end configured to fit within the second end of the tubing segment to produce an interference fit over the first stem end; a second cylindrical clip configured for securing the second end of the tubing segment to the first stem end; and a third cylindrical clip configured for securing the proximal ends of the metal shell and the inner hose to the second stem end. The hose assembly may further include bushings located within second and or third cylindrical clips.

In a second embodiment, the strain relief assembly comprises a ball joint connected to the inlet fitting the ball joint having a channel extending therethrough for water flow.

In some embodiments, a first strain relief assembly is disposed adjacent the inlet fitting and a second strain relief assembly is disposed adjacent the outlet fitting. The metal shell may be a stripwound interlocked coil formed from stainless steel. The inner tubing may be formed of polyvinylchloride or polytetrafluoroethylene. The flexible tubing of the first embodiment may be formed from reinforced polyvinylchloride or polytetrafluoroethylene with a length within a range of 6 to 25 cm. In some embodiments, a protective boot may be provided to enclose the at least one strain relief assembly.

In another aspect of the invention, a strain relief assembly for a metal-shelled hose includes a flexible assembly configured to modify the angle of the metal shell and inner hose assembly relative to the water source when pulled. In a first embodiment, the flexible assembly comprises a flexible tubing segment having a first end, a second end, and a diameter to produce an interference fit over an inlet stem connector of a hose inlet fitting at the first end; a first cylindrical clip configured for securing the first end of the tubing segment to the inlet stem connector; a double-ended hose fitting having a first stem end and a second stem end, the first stem end configured to fit within the second end of the tubing segment to produce an interference fit over the first stem end; a second cylindrical clip configured for securing the second end of the tubing segment to the first stem end; and a third cylindrical clip configured for securing the proximal ends of the metal-shelled hose to the second stem end. The strain relief assembly may further include bushings located within second and or third cylindrical clips. In an alternative embodiment, the flexible assembly comprises a ball joint having a channel extending therethrough for water flow. In some embodiments, a first strain relief assembly is disposed adjacent the inlet fitting and a second strain relief assembly is disposed adjacent the outlet fitting.

The flexible tubing of the first embodiment may be formed from reinforced polyvinylchloride or polytetrafluoroethylene with a length within a range of 6 to 25 cm. In some embodiments, a protective boot made of rubber, silicone, plastic, or similar material, which may be resilient or semi-rigid, may be provided to enclose the strain relief assembly.

BRIEF DESCRIPTION OF THE DRAWINGS

FIG. 5 is a diagrammatic side view of a strain relief assembly according to another embodiment of the invention.

FIG. 6 is a diagrammatic side view of a fitting used in the embodiment of FIG. 5.

DETAILED DESCRIPTION OF EMBODIMENTS OF THE INVENTION

Figure 1:
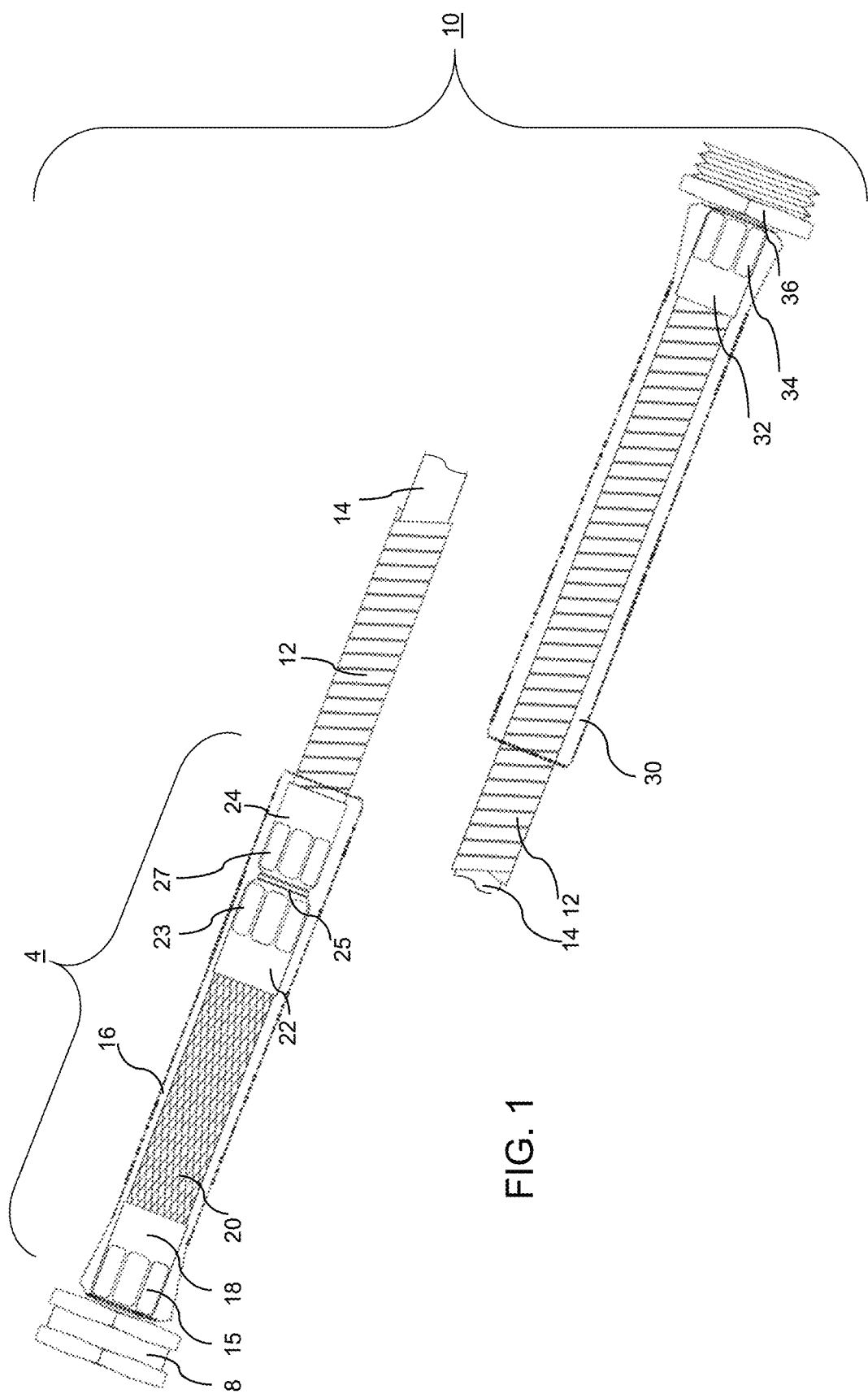
FIG. 1 is a diagrammatic side view of the metal-shelled hose according to an embodiment of the invention.
Figure 2:
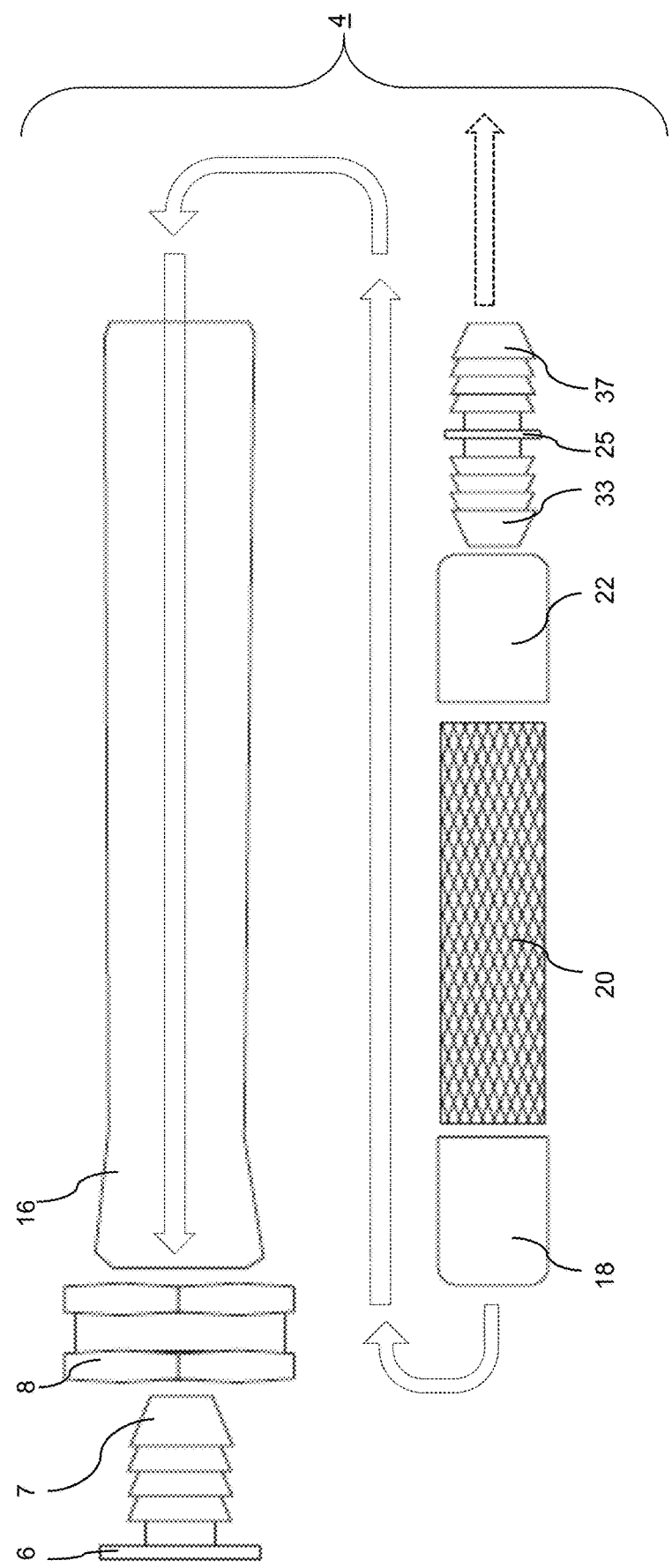
FIG. 2 is an exploded view of a first end of the metal-shelled hose according to an embodiment of the invention.
Figure 3:
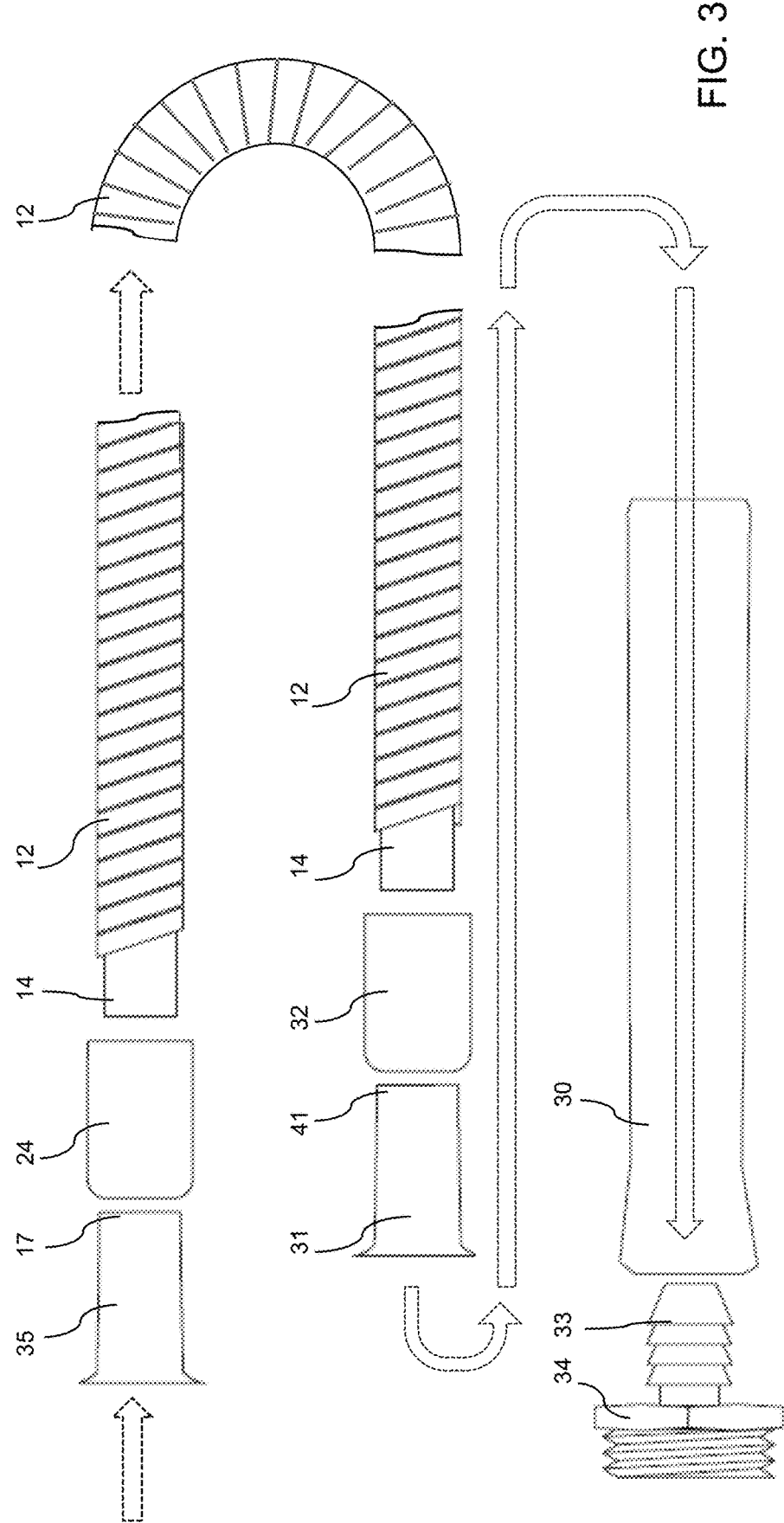
FIG. 3 is an exploded view of a second end of a hose according to an embodiment of the invention.

FIGS. 1-3 illustrate the components of an embodiment of the metal-shelled hose 10 with strain relief according to the invention. Improvements provided by the present invention include strain relief assembly 4, which minimizes the risk of damage to the hose resulting from bending or pulling it around a sharp corner. The basic elements of the hose include conventional hose fittings, corresponding to the female fitting 8 that attaches to a hose bib or faucet via threads or a quick connect fitting, and a male fitting 34 which can be connected to another length of hose or a spray nozzle. The fittings 8 and 34 may be formed from metal such as brass, steel, aluminum or other appropriate metal, or may be a durable plastic or polymer. The end of the hose that attaches to the faucet is the location at which the greatest stresses are applied, when the user pulls the hose to extend it, causing the hose to bend at a non-zero angle relative to the centerline of the faucet. In the embodiment described and illustrated in the figures, a single strain relief assembly 4 is provided at the faucet end, which may also be referred to herein as the "proximal end". In another embodiment, a strain relief section may be included near the outlet end, alternatively referred to as the "distal end."

The length of hose between the proximal and distal ends is formed from a combination of a metal outer shell 12 and a lightweight, flexible synthetic inner tubing 14, for example PVC, PTFE, latex, rubber, or other appropriate material, preferably selected from commercially-available options that are certified by NSF International as drinking water safe (e.g., NSF-61). Outer shell 12 may be formed from stainless steel, e.g., 304 stainless, galvanized steel, painted or powder-coated non-stainless steel, aluminum, nickel, copper, or other appropriate durable metal. In the exemplary embodiment, 304 stainless steel is formed as a stripwound interlocked coil using known manufacturing techniques. Such tubing construction is well-recognized as being lightweight but relatively tough. Other appropriate configurations can include braided or corrugated hose.

Inner tubing 14, is preferably PVC or PTFE, and may be smooth (as illustrated in the figures), with an outer diameter that closely fits the inner diameter of outer shell 12. Alternatively, inner tubing may be convoluted or corrugated to provide additional strength.

Strain relief assembly 4 includes the following primary components: metal clip 18, flexible tubing 20, metal clip 22, double-ended hose fitting 25 and metal clip 24. Details of these components, and their interconnection with other components can be seen in the exploded views of FIGS. 2 and 3. Flexible tubing 20 is formed from a short section of highly flexible polyurethane, polyvinylchloride (PVC), polytetrafluoroethylene (PTFE), or similar polymer or rubber material, preferably reinforced with polyester or other woven braid. For a typical ¾ inch garden hose, the diameter of tubing 20 will be around 1.5 to 2 cm (~0.6 to 0.75 in.) outer diameter. An exemplary wall thickness for the tubing would be on the order of 1-3 mm (0.08 to 0.125 in.), but will depend on the material used and its pressure specifications. Selection of an appropriate material and dimensions will be within the level of skill in the art. In general, to provide the desired degree of flexibility, a suitable tubing would be sufficiently soft and pliable to be doubled over or fully compressed with one's hand (without the aid of a tool.) The length of tubing 20 may be on the order of 5 to 25 cm (~2 to 10 in.). The length may be shorter or longer, however, for manufacturing efficiency and cost, the length would preferably be closer to the shorter end of the range, i.e., 6 to 9 cm (~2.5 to 3.5 in.).

For brevity, the terms "barbed" and "stem" are used herein to describe certain connectors, however, it will be readily apparent to those in the art that this connector may include any type of insertable male connector that is commonly used in hose and tubing connections, including barbed, corrugated, threaded, flared, clamping sleeve, or similar insertable coupler, which forms a water-tight, pressure-resistant seal with the inner surface of tubing by way of an interference-type and/or friction fit. The first end of tubing 20 is expanded to produce an interference fit over stem connector 7 of flanged fitting 6, which connects female fitting 8 to the hose. Metal clip 18, which is a cylinder with a flat end and a rounded end, preferably formed of stainless steel, fits over the outer surface of the first end of tubing 20 and stem connector 7. In some embodiments, clip 18 may be a swaging collar or similar structure configured to mate with a corresponding stem connector. The flat end of metal clip 18 covers the first end of tubing 20, while the rounded end of clip 18 abuts female fitting 8. The rounded end is pressed or crimped to secure it to female fitting 8 position. For example, crimps 15 are illustrated in FIG. 1.

The second end of tubing 20 is press fit over stem connector 33 of double-ended hose fitting 25. Fitting 25 may be formed from metal, e.g., aluminum or steel, or may be plastic or durable polymer. Metal clip 22, with the same flat and rounded construction as clip 18, is crimped (e.g., crimps 23) over the tubing end and barbed connector 33 to secure tubing 20 to fitting 25. Where a swage-style connection is used, appropriate fastening means known in the art may be employed. Stem connector 37 is inserted into the proximal end of inner tubing 14 with bushing 35 over the tubing end. Bushing 35 may be stainless steel, brass, or other appropriate metal, or may be a durable plastic or polymer. The metal clip 24 is slid over the proximal end of the metal shell 12, then over the end 17 of bushing 35 so that the bushing end 17 extends into the proximal end of metal shell 12 between the shell inner surface and the inner tubing 14. The rounded end of metal clip 24 is pressed or crimped (crimps 27) to secure the proximal ends of metal shell 12, bushing 35, and inner tubing 14 to hose fitting 25. In some embodiments, fitting 25 may include a swivel joint to allow relative rotation between the strain relief assembly 4 and the remainder of the hose. To protect the strain relief assembly 4 as well as to improve the appearance and handling of the hose assembly, a protective boot 16 or other tubular sleeve (rubber, metal, silicone, plastic, polymer, or other suitable material, which may be resilient or semi-rigid) may be provided to fit over the entire strain relief portion 4.

At the distal end of the hose assembly, metal clip 32 is slid over the metal shell 12 while the stem connector 33 of male fitting 34 is inserted into the distal end of inner tubing 14 with bushing 31. After sliding the metal clip 32 and outer shell over bushing 31 so that the end 41 of bushing 31 extends between the shell 12 inner wall and the inner tubing 14, the rounded end of metal clip 32 is pressed, crimped or swaged to secure the fitting 34 to the hose. A protective boot 30 or other tubular sleeve (rubber, metal, plastic, polymer, or other suitable material, resilient or semi-rigid) may be provided to enclose the connections. In a preferred embodiment, the boot 30 will be tapered and rounded to facilitate handling of the hose assembly and prevent that portion of the hose from catching on obstacles, edges and other protrusions in the work area. In an alternative embodiment, rather than the direct attachment of the distal end of the hoses (metal shell and inner tubing) to the stem connector 33 of male fitting 34, a second strain relief assembly (not shown) may be provided by using the same components as described above.

Figure 4:
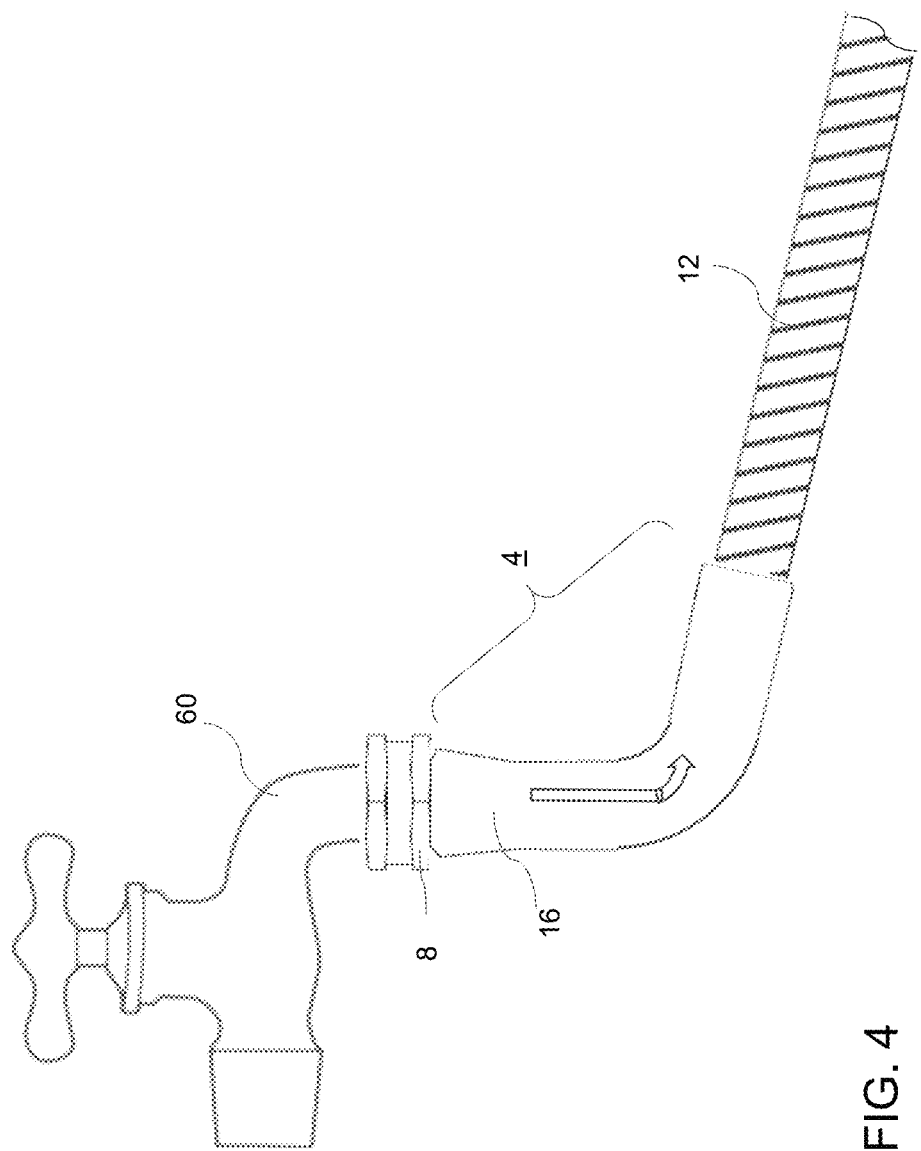
FIG. 4 is a diagrammatic side view of a segment of an inlet section of a hose according to an embodiment of the invention.

FIG. 4 illustrates an example of the inventive hose assembly showing how strain relief section 4 is able to bend at a fairly severe angle, e.g., 90° or smaller relative to the direction of the faucet 60, while the metal shell 12 (and its inner tubing) remains basically straight, or at least is allowed to extend within an appropriate range of curvature for a metal hose while avoiding damage. Even if the strain relief section 4 were to be forced to bend at such an extreme angle so that it collapses on itself, due to its flexibility, any crimping in this section would be reversible—the hose's metal shell 12 would not be damaged.

As an alternative to the flexible tubing strain relief assembly described above, a metal garden hose may incorporate one or more banjo fittings disposed at the female hose (faucet) end to permit bending relative to the faucet. For example, two banjo fittings could be provided with pivot axes that are perpendicular to each other, to provide two degrees of freedom in the angle at which the hose can be pulled relative to the faucet. Another approach would be to incorporate a ball socket on the metal hose to allow the hose to swivel relative to the faucet attachment, as shown in FIGS. 5 and 6.

FIG. 5 illustrates the female (faucet-attachment) hose end of an embodiment that employs a ball joint to provide the necessary flexibility to prevent bending of the metal outer shell of a metal garden hose. As in the previous embodiment, and as shown in FIG. 4, the key is to permit the hose to be pulled at an angle relative to the faucet attachment without causing the hose to be pulled at an angle that is less that the permissible arc of the metal outer shell. In this embodiment, a ball joint, which includes ball portion 54 that rotatably and pivotally fits within socket portion 52, has a construction similar to that of joints commonly used for attachment of showerheads. The joint may be metal, plastic, polymer, or other durable material. As illustrated, socket portion 52 is a two-piece assembly with a threaded attachment to retain the ball head of ball portion 54 within the socket. An O-ring 56 provides a water-tight seal within the joint, while water flows through channel 58, which extends through the length of the joint. The joint is attached, either directly or via a short section of tubing, at one end to female fitting 50 and at the other end has a barbed (or similar) stem extension 62 (shown in FIG. 6) dimensioned for insertion into the hose inner tubing 14. A bushing (not shown) may be fitted over the stem extension 62 and end of inner tubing 14, and a cylindrical metal clip 60 is crimped over the end of the metal outer hose 12, the bushing and the stem extension 62 to secure the assembly. As in the previous embodiment, a boot 16 may be fitted over the strain-relief assembly to facilitate handling and protect the joint from impact and/or dirt. The ball-joint strain relief assembly may optionally be added to the male end of the hose as well. While the ball joint illustrated in the figures shows the socket portion 52 connected to the inlet fitting 50, it will be readily apparent to those in the art that the assembly may be reversed, with the ball joint extending from the inlet fitting 50 and the housing connected to the hose.

The metal garden hose described herein provides a lightweight alternative to conventional rubber hoses, with improved flexibility and durability. The protective metal shell makes the hose puncture proof, thorn proof, tear proof, weather proof, kink proof, and animal proof. Because the hose maintains its open inner structure even when water is not flowing under pressure, it avoids the drawbacks of flat garden hoses that require pressure to expand the flow path. The strain relief assembly avoids damage to the metal shell that can occur when the hose is pulled around corners or sharp edges, or at any angle that is not in a straight line from the faucet.

While the invention has been described with reference to a preferred embodiment, it should be understood that modifications and variations are possible without departure from the scope and spirit of the invention, as defined in the appended claims.

The invention claimed is:

1. A hose assembly comprising:
   a flexible metal shell having a proximal end and a distal end;
   an inner hose disposed within the metal shell, the inner hose having a proximal end and a distal end;
   an inlet fitting connected to the proximal end of each of the metal shell and the inner hose, the inlet fitting having a first end comprising an inlet stem connector and a second end configured for releasable connection to a water source;
   an outlet fitting connected to the distal end of each of the metal shell and the inner hose, the outlet fitting having an outlet stem connector;
   a double-ended hose fitting having a first stem end and a second stem end, the second stem end connected to the proximal ends of the metal shell and the inner hose; and
   a strain relief assembly disposed lengthwise between the inlet fitting and the proximal ends of the metal shell and the inner hose, the strain relief assembly comprising a non-metallic compliant and resilient tubing segment that can be compressed or bent at an angle of 90° or smaller with reversible crimping, the tubing segment having a first end secured to the inlet stem connector and a second end secured to the first stem of the double-ended hose fitting, the strain relief assembly configured to increase flexibility of the hose assembly by permitting an angle of the metal shell and inner hose relative to the water source when the hose is pulled relative to the water source to minimize bending of the metal shell.

2. The hose assembly of claim 1, wherein the at least one strain relief assembly further comprises:
   a first cylindrical clip configured for securing the first end of the tubing segment to the inlet stem connector;
   a second cylindrical clip configured for securing the second end of the tubing segment to the first stem end; and
   a third cylindrical clip configured for securing the proximal ends of the metal shell and the inner hose to the second stem end.

3. The hose assembly of claim 2, further comprising a bushing disposed within the second cylindrical clip.

4. The hose assembly of claim 2, further comprising a bushing disposed within the third cylindrical clip.

5. The hose assembly of claim 2, wherein the tubing segment comprises reinforced polyvinylchloride or polytetrafluoroethylene.

6. The hose assembly of claim 1, further comprising a second strain relief assembly disposed adjacent the outlet fitting.

7. The hose assembly of claim 1, wherein the metal shell comprises a stripwound interlocked coil formed from stainless steel.

8. The hose assembly of claim 1, wherein the inner tubing comprises polyvinylchloride or polytetrafluoroethylene.

9. The hose assembly of claim 1, wherein the tubing segment has a length within a range of 6 to 25 cm.

10. The hose assembly of claim 1, further comprising a protective boot enclosing the strain relief assembly.

11. A strain relief assembly for a metal-shelled hose, comprising:
    a flexible assembly disposed lengthwise at least between an inlet fitting and proximal ends of a metal shell and an inner hose of a metal-shelled hose assembly, the flexible assembly configured to impart flexibility to the hose assembly to permit an angle of the metal shell and inner hose to be changed relative to a water source to which the inlet fitting is attached when the hose is pulled relative to the water source to minimize bending of the metal shell, the flexible assembly comprising a non-metallic compliant resilient tubing segment that can be compressed or bent at an angle of 90° or smaller with reversible crimping, the tubing segment having a first end secured to the inlet fitting and a second end secured to a first end of a double-ended hose fitting attached to the proximal ends of the metal shell and the inner hose.

12. The strain relief assembly of claim 11, wherein the flexible assembly further comprises:
    a first cylindrical clip configured for securing the first end of the tubing segment to an inlet stem connector of the inlet fitting;
    a second cylindrical clip configured for securing the second end of the tubing segment to the first end of the double-ended hose fitting; and
    a third cylindrical clip configured for securing the proximal ends of the metal-shelled hose to a second end of the double-ended hose fitting.

13. The strain relief assembly of claim 12, further comprising a bushing disposed within the second cylindrical clip.

14. The strain relief assembly of claim 12, further comprising a bushing disposed within the third cylindrical clip.

15. The strain relief assembly of claim 12, wherein the flexible tubing comprises reinforced polyvinylchloride or polytetrafluoroethylene.

16. The strain relief assembly of claim 12, wherein the flexible tubing has a length within a range of 6 to 25 cm.

17. The strain relief assembly of claim 12, further comprising a protective boot.

* * * * *